United States Patent [19]

Chisum

[11] 4,074,822
[45] Feb. 21, 1978

[54] METHOD AND APPARATUS FOR TRANSPORTING ONE VEHICLE BY ANOTHER

[76] Inventor: Finis Lavell Chisum, Rte. 5, Woodcrest Heights, Claremore, Okla. 74017

[21] Appl. No.: 695,374

[22] Filed: June 14, 1976

Related U.S. Application Data

[63] Continuation-in-part of Ser. No. 336,869, Feb. 28, 1973.

[51] Int. Cl.² .............................................. B60P 3/00
[52] U.S. Cl. ................................................... 214/152
[58] Field of Search ................. 214/515, 505, 506, 41, 214/152, 38 R, 85; 280/80 B; 296/1 A

[56] References Cited

U.S. PATENT DOCUMENTS 2,009,654  7/1935  Fleet .............................. 296/1 A X
2,582,767  1/1952  Carey ............................. 296/1 A X
2,753,064  7/1956  Lesser ........................... 280/80 B X

*Primary Examiner*—Albert J. Makay
*Attorney, Agent, or Firm*—William R. Laney

[57] ABSTRACT

A method for transporting one tractor and semi-trailer combination on another tractor and towed semi-trailer which comprises reducing the wheel base of the transported tractor-semi-trailer combination, positioning the transported tractor and semi-trailer on the transporting semi-trailer with the tractor at the rear of the transporting semi-trailer and facing rearwardly, and with the rear end portion of the transported semi-trailer elevated from its normal position and extending over the cab of the towing tractor used for transport. Apparatus is provided on a tractor-semi-trailer combination to facilitate the described wheel base shortening, and the elevation of the rear end portion of the transported semi-trailer.

2 Claims, 15 Drawing Figures

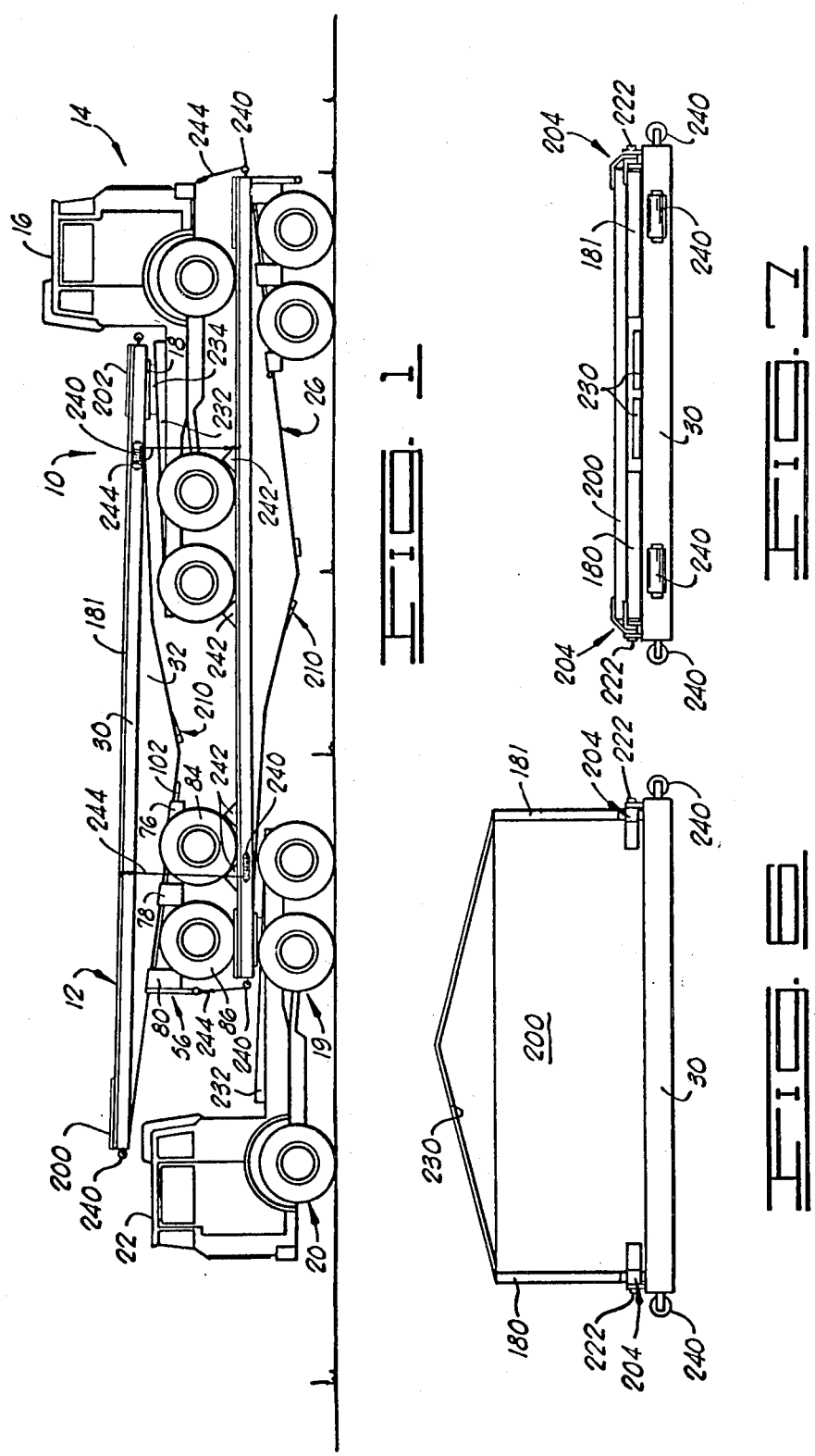

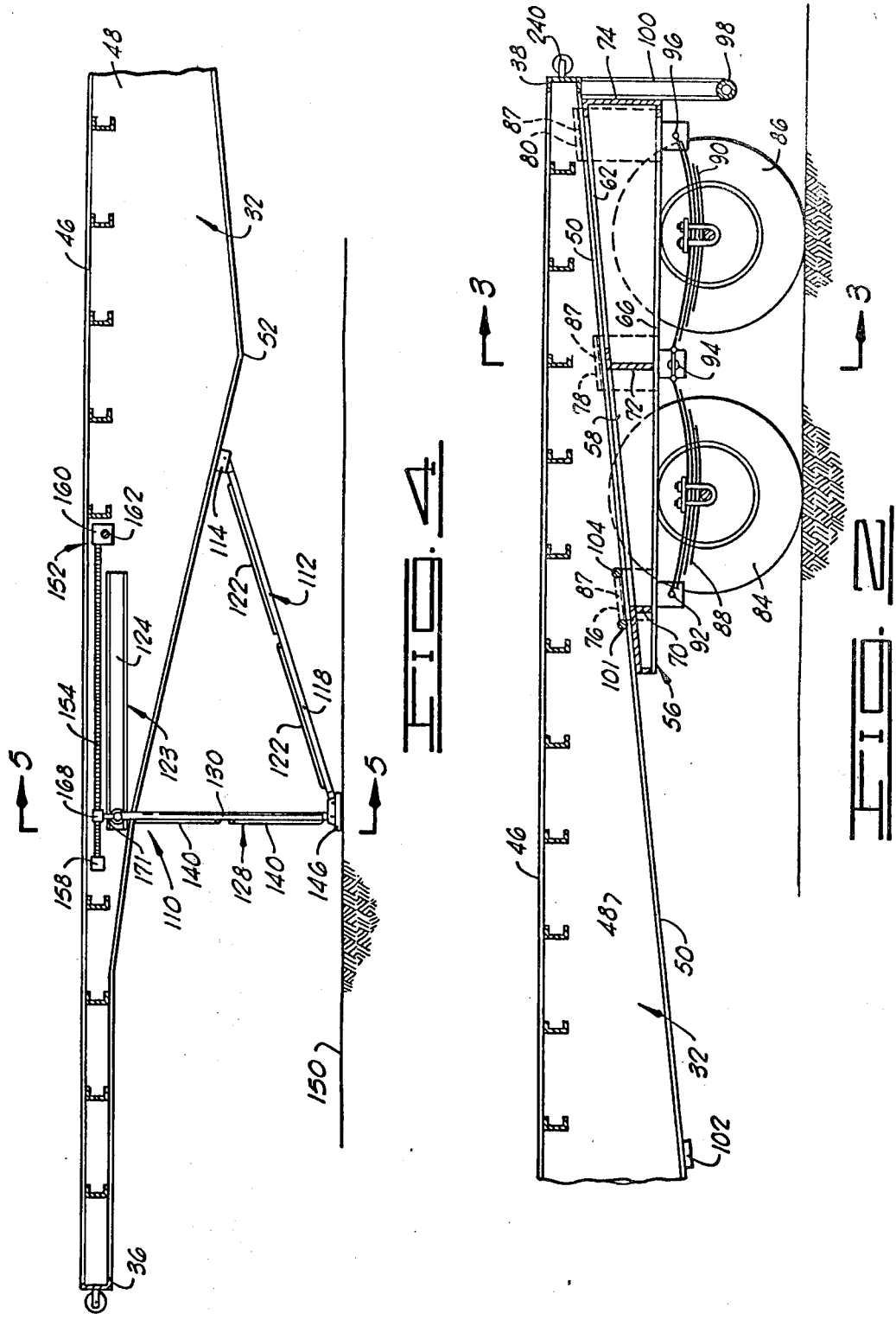

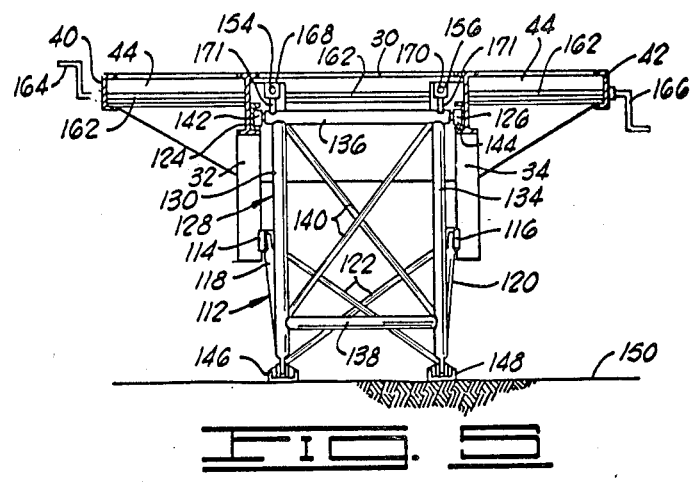
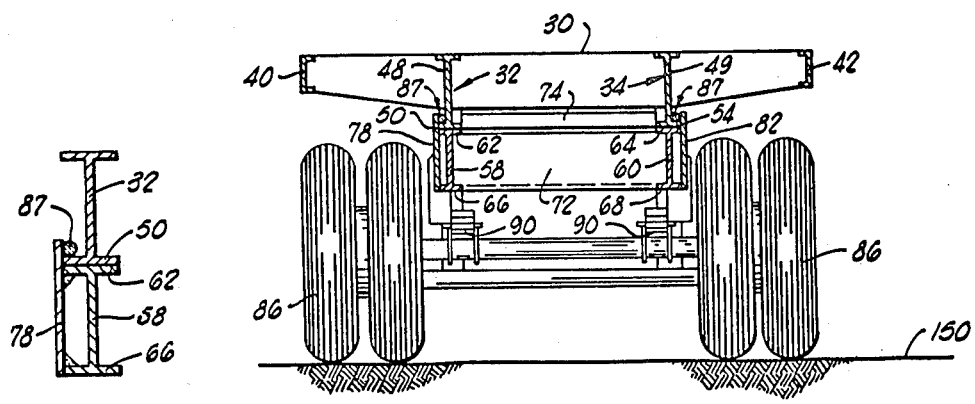
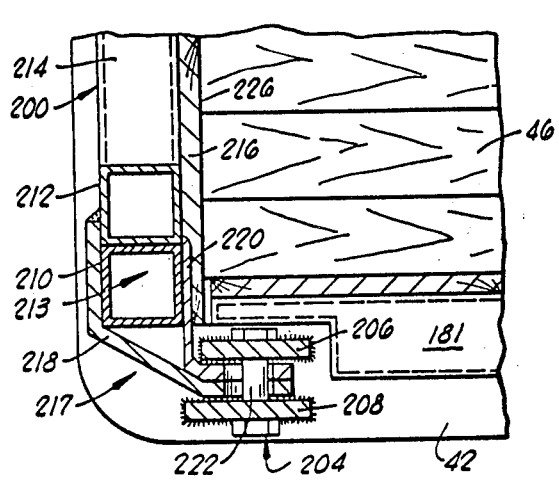
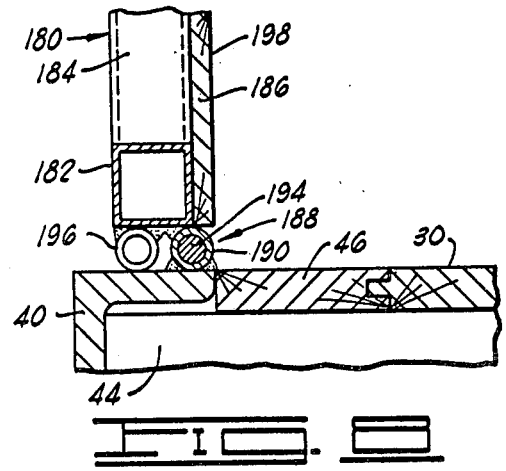

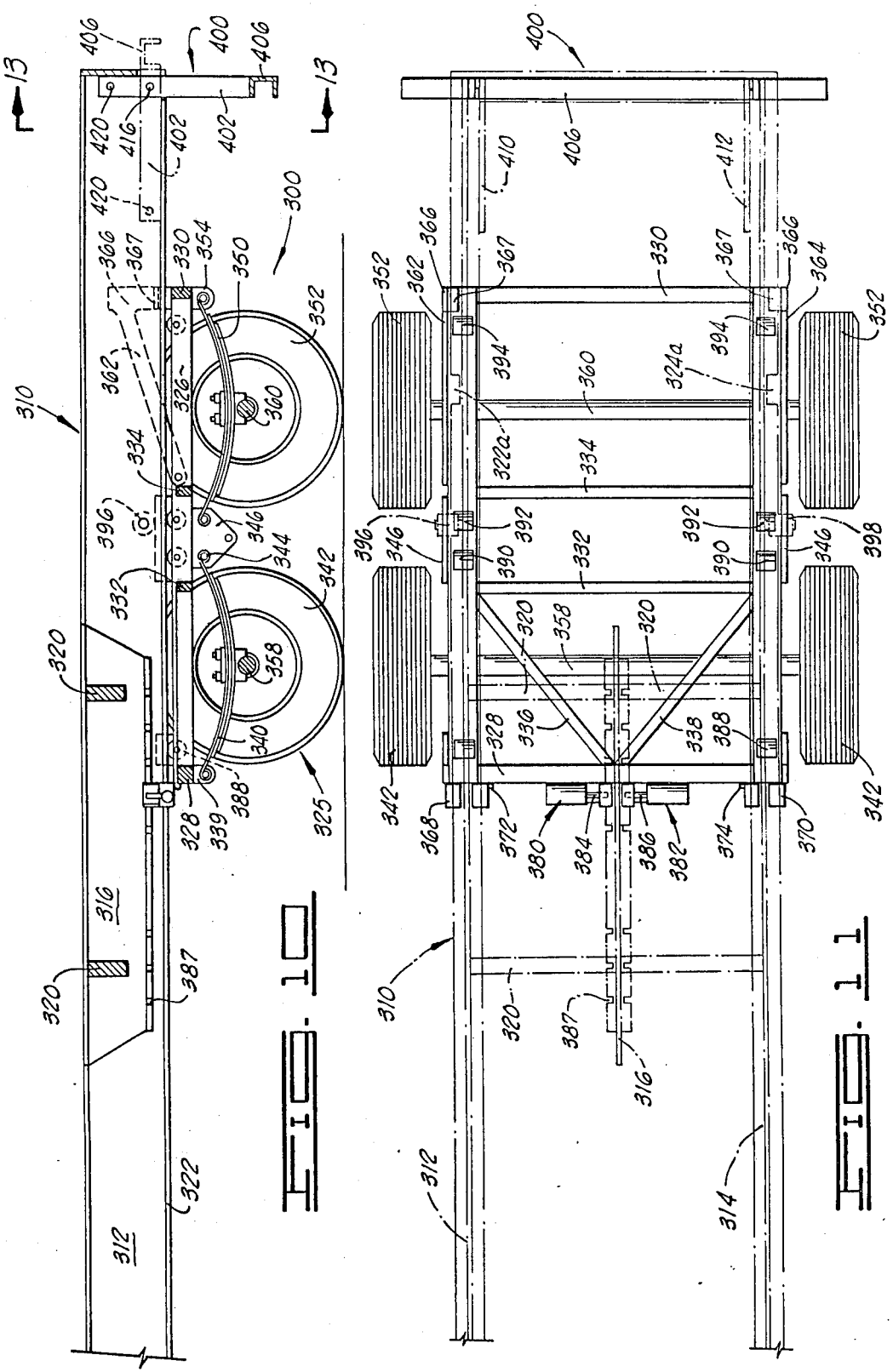

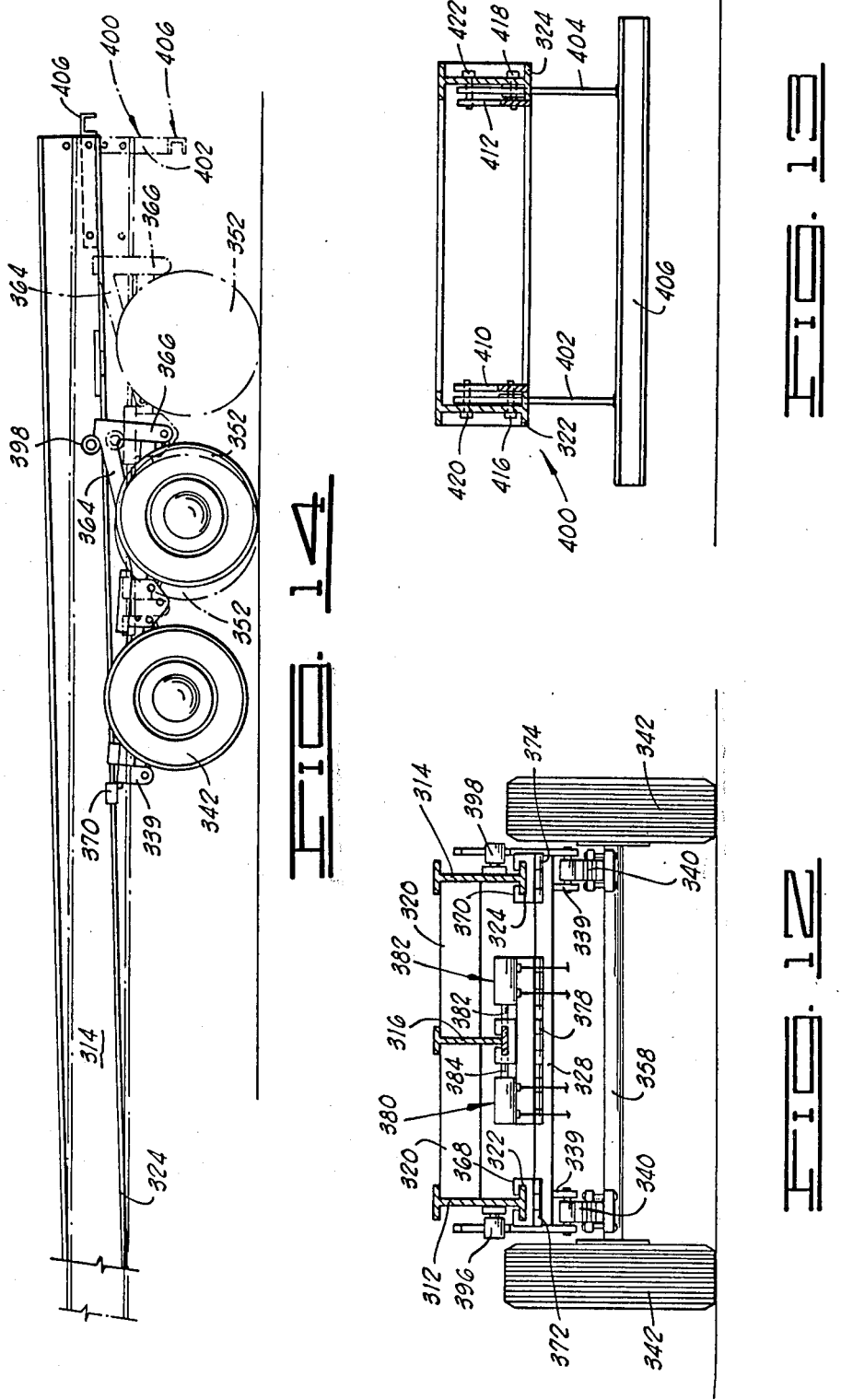

METHOD AND APPARATUS FOR TRANSPORTING ONE VEHICLE BY ANOTHER

RELATED APPLICATIONS

This application is a continuation-in-part of my United States Application Ser. No. 336,869 filed Feb. 28, 1973 and entitled "Apparatus for Transporting One Vehicle by Another."

BACKGROUND OF THE INVENTION

1. Field of the Invention

The present invention relates to load carrying vehicles, and more particularly, but not by way of limitation, relates to a method for transporting one semi-trailer and tractor combination upon a second semi-trailer and tractor combination, and further relates to a novel semi-trailer and tractor construction which can be transported in accordance with the method of the present invention.

2. Brief Description of the Prior Art

As is well known in the trucking industry, in order to obtain maximum utilization and therefore maximum efficiency and profit from the operation of a fleet of trucks, it is necessary to have a pay load at all times. Thus, on long trips, it is essential to carry one pay load during the out trip, and another pay load during the return trip. However, in practice, the pay load during the return trip is seldom available and the truck must be returned to its base of operation empty. This situation is especially prevalent when hauling steel beams and the like on flat bed trucks from a fabrication mill, or in hauling wheat from outlying elevators to a granary. Not only is the empty return trip uneconomical because of the use of fuel, but it also results in considerable wear on the vehicle. In this respect, it will be appreciated that the damage to the vehicle is compounded by the fact that the spring suspension system is designed to carry a heavy load. Therefore, when the truck is operated without a load, it is, for all practical purposes, rigidly supported rather than spring supported, which results in severe vibrations and shocks, especially to the semi-trailer. On trips of any substantial length, the driver usually must stay overnight and sleep before he is able to safely drive the return trip. This not only results in wasted operator time, but also greatly reduces the usable time of the truck.

In view of these fundamental difficulties in fully utilizing trucks, it has long been recognized that whenever the job is such as to require two trucks to carry a pay load to a destination, and there is no return load, it would be desirable to transport one truck by the other. Although this concept has occasionally been used to transport a smaller truck on a larger one, it heretofore has not been feasible because all trucks designed for long hauls are invariably constructed as large as possible and still remain within the maximum length, width and height limitations imposed by the laws of the several states. Consequently, all trucks are of approximately the same overall dimensions and one truck cannot normally be loaded onto the other in the absence of special equipment.

BRIEF SUMMATION OF THE PRESENT INVENTION

Therefore, it is an important object of the present invention to provide a novel vehicle construction and a novel method for loading the vehicle upon a similar vehicle for transport. Without intending to limit the present invention as defined by the appended claims, the method in accordance with the invention may more specifically be described as reducing the wheel base of a first semi-trailer and tractor combination, lowering the forward end of a second semitrailer to the ground to form a ramp, driving the first semitrailer and tractor onto the second semitrailer with the first tractor at the rear end of the second semitrailer, raising the rear end of the first semitrailer, and loading the second semitrailer onto the second tractor. The rear end of the first semitrailer will then be raised sufficiently to extend over the cab of the second tractor. When the first semitrailer and tractor combination is secured on the second, the two are then ready for transport using but one driver and operating only one tractor.

It is also a very important object of the present invention to provide an improved semitrailer construction for use in accordance with the method of the present invention. In particular, without intending to limit the present invention, a semitrailer constructed in accordance with the present invention has an elongated load bed, a plurality of rear support wheels disposed adjacent the rear end thereof, an elongated track connected to the underside of the load bed adjacent the rear thereof and extending forwardly and sloping downwardly from the load bed, and means slidably connecting the rear support wheels to the elongated track for moving the wheels along the track, whereby the inclined track will raise the rear end of the load bed as the wheels are moved forwardly to shorten the wheel base of the semi-trailer and tractor. The present invention further contemplates a novel lift mechanism for lowering the forward end of the second semitrailer to the ground and for raising the forward end after the semitrailer is loaded to a sufficient height to be coupled to the fifth wheel of a tractor, as well as several other more specific features which will presently be described in the specification and pointed out in the appended claims.

Many additional objects and advantages of the present invention will be evident to those skilled in the art from the following description and drawings, wherein:

FIG. 1 is a side elevational view of a pair of similarly constructed semitrailers and tractors constructed in accordance with the present invention, and loaded one upon the other in accordance with the method of the present invention.

FIG. 2 is a longitudinal sectional view of the rear end of one of the semitrailers illustrated in FIG. 1.

FIG. 3 is a sectional view taken substantially on line 3—3 of FIG. 2.

FIG. 3a is an enlarged sectional view for better illustrating the details of construction of a portion of the structure shown in FIG. 3.

FIG. 4 is a longitudinal sectional view of the forward end of one of the semitrailers shown in FIG. 1, and illustrates a novel lift apparatus constructed in accordance with the present invention.

FIG. 5 is a sectional view taken substantially on line 5—5 of FIG. 4.

FIG. 6 is an end view of the load bed of one of the semitrailers illustrated in FIG. 1, which is especially adapted to transport grain and other particulate material.

FIG. 7 is a view similar to FIG. 6 showing the side boards and end gate of the semitrailer shown in FIG. 6 pivotally folded downwardly for transport in accordance with the method of the present invention.

FIG. 8 is a transverse sectional view illustrating the details of the hinge structure pivotally interconnecting the side boards and the load bed of the semitrailers of FIG. 1.

FIG. 9 is a sectional view taken on a horizontal plane through the corner of one of the semitrailers with the side boards and end gate up, and serves to illustrate the details of the hinge structure pivotally interconnecting the end gate and the load bed.

FIG. 10 is a vertical sectional view taken through and along the longitudinal center line of a semitrailer load bed and supporting bogie wheel structure, showing an alternate embodiment of the invention.

FIG. 11 is a plan view of the bogie wheel structure forming a part of the embodiment of the invention illustrated in FIG. 10, and showing the semitrailer load bed in phantom.

FIG. 12 is a transverse sectional view taken across the load bed of the semitrailer shown in FIG. 10 at a location just ahead of the ground engaging wheels.

FIG. 13 is a sectional view taken along line 13-13 of FIG. 10.

FIG. 14 is a side elevation view of the rear end portion of the semitrailer load bed illustrated in FIG. 10, and showing in full lines the piggyback carriage status of the bogie wheel assembly.

DETAILED DESCRIPTION OF A PREFERRED EMBODIMENT OF THE INVENTION

Referring now to the drawings, and in particular to FIG. 1, a first semitrailer and tractor combination is indicated generally by the reference numeral 10 and is comprised of a semitrailer 12 and a tractor 14. The tractor 14 has a sleeper type operator's cab 16 and a fifth wheel 18 which is slidably supported on a novel track extending longitudinally of the tractor chassis, as hereafter described in greater detail. A second semitrailer and tractor combination, indicated generally by the reference numeral 19, is comprised of a tractor 20 and a semitrailer 26, which may be of substantially identical construction to the semitrailer and tractor combination 10. The tractor 20 has a sleeper type operator's cab 22 and a fifth wheel 24 which may also be slidably mounted on a track on the tractor chassis, as will hereafter be described in greater detail, and the semitrailer 26 is connected to the tractor 20 by the fifth wheel 24. Since the first and second semitrailer and tractor combinations 10 and 19 are of identical construction, for convenience of discussion and illustration, only the first semitrailer and tractor combination 10 will now be described in detail. Therefore, it is to be understood that the semitrailer and tractor combination 19 is similarly constructed and accordingly, like parts are designated by like reference numerals. However, it is to be expressly understood that although the semitrailers are preferably of identical construction for maximum versatility, each of the semitrailers may be provided with only that portion of the total equipment to be hereafter described which is essential in the event it is desired to always load the first combination upon the second, which necessary equipment will hereafter be pointed out in greater detail.

The semitrailer 12 is comprised of an elongated load bed 30 fabricated in accordance with known techniques from a pair of longitudinally extending parallel I-beams 32 and 34 which extend the entire length of the load bed and are interconnected at the respective ends by a front channel 36 and a rear channel 38. The I-beams 32 and 34 have an outline substantially as shown by a composite of FIGS. 2 and 4, and are located somewhat centrally and spaced apart as best seen in the transverse sectional views of FIGS. 3 and 5. Side channel beams 40 and 42 interconnect the ends of the transverse channel beams 44 which provide supports for plywood or other wooden decking 46 which covers the load bed. It will be noted that the beams 32 and 34 have web portions 48 and 49, respectively, (see FIG. 3) vertically disposed and are wider at the center of the load bed for greater strength. The beams 32 and 34 also have lower flanges 50 and 54 which are straight along the portions from the rear transverse channel 38 to the point 52 shown in FIG. 4. The straight portions of the lower flanges 50 and 54 adjacent the rear end of the semitrailer then form an elongated track means which extends forwardly from the rear end of the semitrailer and slopes downwardly with respect to the upper surface or decking 46 of the load bed 30.

A bogie wheel frame, indicated generally by the reference numeral 56, is comprised of a pair of I-beams 58 and 60, as best seen in FIG. 3. The I-beams 58 and 60 are wedge-shaped, as best seen in FIG. 2, and have upper flange portions 62 and 64, respectively, which engage the lower flanges 50 and 54 of the longitudinal I-beams 32 and 34, respectively. The lower flange portions 66 and 68 of the I-beams 58 and 60 are disposed generally parallel to the upper face of the load bed and are therefore normally horizontal. The I-beams 58 and 60 are preferably interconnected by three transverse bracing I-beams 70, 72 and 74, which extend across the front end, the middle and the rear end, respectively, of the wedge-shaped I-beams 58 and 60. Three strap plates 76, 78 and 80 are welded to the outer edges of the flange portions 62 and 66 of the I-beam 58 and to the webs of the respective transverse bracing I-beams 70, 72 and 74, and extend upwardly to a point above the lower flange 50 of the main I-beam 32. Three similar strap plates are connected to the outer edges of the flange portions 64 and 68 of the other wedge-shaped I-beam 60 and to the webs of the three transverse bracing I-beams. However, only the middle strap plate 82, which is disposed opposite the middle strap plate 78, is shown in FIG. 3. Thus, it will be noted that each of the strap plates extends upwardly above the lower flanges 50 and 54 of the main longitudinal I-beams 32 and 34 and prevent the bogie wheel frame 56 from moving transversely of the load bed and disengaging the track means formed by the flanges 50 and 54. The upper ends of the several strap plates are either bent inwardly or provided with suitable dogs, such as the bars 87 (see FIG. 3a) which are welded to the inside faces of the strap plates 78 and 82, as illustrated in FIG. 3. The inwardly bent ends or dogs 87 of the several strap plates thereby provide a positive sliding connection between the bogie wheel frame 56 and the load bed 30, which will permit the bogie wheel frame to move relative to the track means formed by the flanges 50 and 54. A plurality of dual support or bogie wheels 84 and 86 may be connected to the bogie frame 56 by leaf springs 88 and 90, respectively, in the conventional manner, such as by suitable shackles 92, 94 and 96. A rear bumper 98 may be connected to the rear end of the bogie frame 56 by suitable I-beam structure 100 such that the bumper will move with the bogie wheel frame along the track means.

In summary, it will be noted that the bogie wheel frame 56 and bogie wheels 84 and 86 attached thereto are free to slide along the track means formed by the lower flanges 50 and 54, but are continually retained in the proper transverse position by the side straps and positively attached to the flanges 50 and 54 by the bent-over ends or dogs 87. However, the bogie frame 56 is retained in the rear position for normal road operations by an elongated bar 101 (see FIG. 2) which extends through the web of the I-beams 32 and 34 and which is so positioned as to contact the forward strap plate 76 and the corresponding forward strap plate (not shown) which is welded to the other wedge-shaped I-beam 60. When the bar 101 is removed, the bogie frame 56 can be made to move forwardly along the track means formed by the lower flanges 50 and 54 until the forward end of the bogie frame 56 contacts a pair of stops 102 which may be welded to the underside of the flanges 50 and 54 as illustrated in FIG. 2. The bogie frame 56 will then be in the forward position, which is the position of the bogie frame and wheels of the semitrailer 12 in FIG. 1, and in this position, a second pair of apertures 104 (see FIG. 2) will then be aligned behind the rear strap plate 80 and the corresponding strap plate welded to the other I-beam 60. The bar 101 can then be inserted in the apertures 104 to secure the bogie frame 56 in the forward position so that the first semitrailer and tractor combination 10 can be loaded onto the second in accordance with the method of the present invention as hereafter described.

Referring now to FIGS. 4 and 5, a novel lift apparatus for raising the forward end of the semitrailer bed is indicated generally by the reference numeral 110. The lift apparatus 110 comprises a first elongated frame member 112 which is pivotally connected to the underside of the semitrailer load bed by suitable brackets 114 and 116 which are welded to the underside of the lower flanges 50 and 54 of the I-beams 32 and 34, respectively. The elongated frame member 112 may be comprised of a pair of elongated tubular members 118 and 120 which are interconnected by crossbraces 122, as best seen in FIG. 5. A second elongated track means, indicated generally by the reference numeral 123, extends generally parallel to the upper surface of the load bed 30. The track means may conveniently be formed by a pair of facing channel beams 124 and 126 which are welded to the inner faces of the webs 48 and 49 of the I-beams 32 and 34, respectively.

A second elongated, upright frame member is indicated generally by the reference numeral 128 and may conveniently consist of a pair of upright tubular compression members 130 and 134 which are interconnected at the upper ends by a transverse upper member 136 and which are interconnected adjacent the lower ends by a transverse lower member 138. If desired, tension crossbraces 140 may be provided for lateral bracing.

A pair of rollers 142 and 144 are journaled on the opposite ends of the upper transverse member 136 and in the channels 124 and 126, respectively, so as to engage either the upper or lower flanges of the respective channels. The lower ends of the upright compression members 130 and 134 are pivotally connected to shoes 146 and 148, respectively, which engage the surface of the ground 150 when the lift apparatus 110 is in operation as hereafter described. The forward ends of the tubular members 118 and 120 of the first frame member 112 are also pivotally connected to the shoes 146 and 148, respectively. Thus, it will be noted that the rear end of the frame member 112 is pivotally connected to the underside of the load bed 30 and the forward end is pivotally connected to the lower end of the upright frame member 128 by the shoes 146 and 148, while the lower end of the upright frame member 128 is pivotally connected to the shoes and the upper end moves along the second elongated track means formed by the channels 124 and 126.

The upper end of the frame member 128 is propelled forwardly and rearwardly along the second elongated track means by a drive mechanism, indicated generally by the reference numeral 152. The drive mechanism is comprised of a pair of elongated, threaded rods 154 and 156 which are disposed parallel to the channels 124 and 126. The threaded rod 154 is journaled on the web 48 of the I-beam 32 by a forward journal box 158 and a rear gear box 160. The threaded rod 156 is similarly journaled on the web 49 of the I-beam 34 by a forward journal box and a rear gear box (not shown). A transverse drive shaft 162 extends through the side channel 40, the web 48 of the I-beam 32, the gear box 160, the gear box (not illustrated) for the threaded rod 156, the web 49 of the I-beam 34, and the web of the other side channel 42. A pair of hand cranks 164 and 166 are provided at the outer ends of the transverse drive shaft 162 for rotating the drive shaft and consequently the threaded rods 154 and 156 by means of the respective gear boxes. It will be appreciated that the hand cranks 164 and 166 may be disconnected from the drive shaft 162 in such a manner as to leave no projections extending beyond the edge of the respective side channels 40 and 42. Nuts 168 and 170 are threaded onto the threaded rods 154 and 156, respectively, and are pivotally connected to the upper end of the frame member 128 by suitable means, such as the brackets 171 which may conveniently be connected to the transverse member 136.

From the above description of the lift apparatus 110, it will be evident that when the hand cranks 164 and 166 are rotated in such a manner as to move the nuts 168 and 170 forwardly along the threaded rods 154 and 156, the upper end of the second frame member 128 will also be moved forwardly along the track means 123 and the lower end of the frame member 128 will be lowered from the load bed 30 until the shoes 146 and 148 engage the ground 150. Then the forward end of the semitrailer 12 and the load bed 30 will be raised until the member 128 is vertical, as illustrated in FIG. 4, at which time the load bed will be generally horizontal. The length of the member 128 should be selected such that the forward end of the semitrailer 12 can be raised sufficiently high that the tractor 14 can be backed under the semitrailer to connect the semitrailer to the fifth wheel 18. As the lower end of the second frame member 128 is moved away from the load bed 30 and the load bed is raised, it will be evident that the first frame member 112 will be placed in tension.

When the hand cranks 164 and 166 are rotated in the other direction, the nuts 168 and 170 will be moved rearwardly along the threaded rods 154 and 156 and the upper end of the member 128 will also be moved rearwardly along the track means 123 formed by the channels 124 and 126. The first frame member 112 will then be placed in compression such that the lower end of the second frame member 128 will be maintained in approximately the same position longitudinally of the load bed, while the upper end of the second frame member 128 will be moved rearwardly along the track means 123. The shoes 146 and 148 will then be moved toward the load bed 30 and the forward end of the load bed will accordingly be lowered until it engages the ground.

It will be noted that by utilizing the threaded rods 154 and 156, the drive mechanism 152 will automatically be locked in any intermediate position, whether in the process of raising or lowering the load bed, without any exertion of force upon the hand cranks 164 and 166. Because of the high mechanical advantage of the drive mechanism, the two drivers of the trucks can raise or lower the load bed even when fully loaded by the other semitrailer and tractor combination, as hereafter described, without danger of the hand cranks running away due to the weight of the load, and thereby injuring the driver or damaging the vehicles. It will also be evident that an electric or fluid motor may be used to rotate the drive shaft, or the drive shaft and threaded rods may be replaced by hydraulic or pneumatic linear actuators for moving the upper end of the second frame member 128 along the track means 123. Further, it should be noted that the frame members 112 and 128 are so dimensioned as to be completely retractable between the I-beams 32 and 34 and not to interfere with normal operation of the semitrailer and tractor combination.

It will be appreciated by those skilled in the art that the semitrailer 12 heretofore described may be merely a flatbed or a so-called "stake bed" for transporting various large objects. However, it is an important aspect of the present invention to provide a semitrailer with peripheral side boards for hauling grain, gravel and other particulate material. Referring collectively to FIGS. 1, 6 and 7, a pair of side boards 180 and 181 and a pair of end gates 200 and 202 are pivotally connected along the respective lower edges to the load bed 30. When raised, the side boards and end gates form a continuous fence around the periphery of the load bed in a conventional manner, and when pivotally lowered, assume the positions shown in FIGS. 1 and 7.

Referring now to FIG. 8, which is a transverse sectional view through one edge of the semitrailer 12 and the side board 180, which is raised to the position shown in FIG. 6, it will be noted that, as previously described, the wooden decking 46 which forms the upper face of the load bed 30 rests on the transverse channels 44 which are connected to the side channel 40. The side board 180 is comprised of a suitable frame fabricated from square tubular metal stock. The frame has a longitudinally extending member 182 and a number of upright members 184 fabricated from the square tubular stock. Plywood plating 186 is bolted to the frame members 182 and 184 to complete the side board. The lower edge of the side board 180 is pivotally connected to the upper flange of the side channel 40 of the load bed 30 by a hinge indicated generally by the reference numeral 188. The hinge 188 is preferably of the type known as a "piano hinge" and is comprised of an outer tubular member 190 which is cut into a plurality of segments (not illustrated). Alternate segments are welded to the channel 40 and to the member 182. A long rod 194 is then passed through all of the segments of the outer tubular member 190 and functions as the hinge pin. A second tubular member 196 is preferably welded to the underside adjacent the outer edge of the longitudinally extending square tubular member 182, substantially as illustrated in FIG. 8, and serves as a spacer to arrest pivotal movement of the side board 180 when the side board is in the vertical position. It will be noted that the pivotal axis of the hinge 188 is so positioned relative to the inner face 198 of the side board 180 that when the side board 180 is pivoted into the horizontal position, the inner face 198 will rest flatly against the upper surface of the load bed 30 so that the other vehicle can be driven over the lowered side board, as hereafter described, without damage to the side board or the hinge.

The rear end gate 200, which may be seen in FIGS. 1, 6, 7 and 9, and the front end gate 202, which can be seen only in FIG. 1, are pivotally connected to the load bed 30 by a pair of hinges, each of which is indicated generally by the reference numeral 204, as illustrated in detail in the horizontal sectional view of FIG. 9. Referring now to FIG. 9, it will be noted that the end gate 200 is constructed in the same manner as the side boards 180 and 181 from square tubular stock and plywood facing. Accordingly, two upright, square tubular members 210 and 212 form a corner post 213, while a horizontal member 214 forms the lower edge of the end gate 200. A plywood panel 216 is bolted to the inner surfaces of the square tubular members in any suitable manner to complete the end gate. A pair of upright plates 206 and 208 are welded to the upper flange of the side channel 42 and form a trunnion. A hinge strap 217 is comprised of an outer plate 218, which is welded to the outer face of the corner post 213, and an inner plate 220 which is welded to the inner surface of the corner post 213. The plates 218 and 220 are bent substantially as illustrated to mate and form the hinge strap 217 which then extends between the plates 206 and 208. A bolt 222 extends through suitable apertures in the trunnion plates 206 and 208 and in the hinge strap 217 and functions as a hinge pin.

It will be noted that the inner face 226 of the plywood panel 216 is offset from the center of the bolt 222 which serves as the pivot pin of the hinge 204 and the bolt 222 is also raised from the face of the load bed 30. Thus, it will be noted that when the side boards 180 and 181 are pivoted from the vertical position into the horizontal position and lay flat on the load bed 30, the end gates 200 and 202 can then be pivoted into the horizontal position illustrated in FIGS. 1 and 7 and will overlie the side boards 180 and 181. In this connection, the total distance the inner face 226 is offset from the center of the pivot bolt 222 plus the distance the center of the pivot bolt 222 is above the face of the load bed 30 should equal the thickness of the side boards 180 and 181 such that the entire surface of the end gates will contact the side boards. Then, when the semitrailer and tractor are driven over the folded down end gates and side boards, as hereafter described, the end gates 200 and 202 and the hinges 188 and 204 will not be damaged.

If desired, a plurality of ribs 230 having a triangular shape as illustrated in FIG. 6 may extend transversely of the load bed between the upper edges of the side boards 180 and 181 to brace the side boards in upright position and to provide a support for a tarpaulin or other protective covering in a conventional manner. When the ribs 230 are disconnected and the side boards and end gates folded down, the ribs 230 may be stored between the side boards 180 and 181 on the load bed 30 as illustrated in FIG. 7.

A track means 232 extending longitudinally of the tractor chassis and sloping upwardly from the rear of the tractor toward the front of the tractor is provided for slidably mounting the fifth wheel 18. The track means 232 may be similar in construction to the track means formed by the lower flanges 50 and 54, except upwardly facing. A frame 234, which may be constructed in the same manner as the bogie wheel frame 56, is slidably connected to the track means 232 in the same manner as the bogie frame 56 is connected to the track means formed by the flanges 50 and 54. The fifth wheel 18 is then pivotally connected to the frame 234 by a horizontal, transversely extending axle in the same manner that fifth wheels are conventionally connected to the chassis of a tractor. As the frame 234 and fifth wheel 18 are moved forwardly over the upwardly sloping track means 232, to shorten the wheel base of the vehicle in accordance with one aspect of the present invention, the fifth wheel 18 and consequently the forward end of the semitrailer 12 will be raised sufficiently to clear the rear end of the tractor 14. In some cases it may be unnecessary to utilize the movable fifth wheel to shorten the wheel base of the vehicle, and in cases where the load bed is so designed to clear the rear of the tractor when the fifth wheel is moved forwardly, of course the track means 232 may be level. However, in extreme cases, both features may be necessary.

A plurality of cable winches 240 may conveniently be connected to the edges of the load bed 30 for securing the semitrailer and tractor combination 10 on the load bed of the semitrailer 26. A pair of the cable winches 240 are preferably connected at the front and rear ends of each of the load beds, as best seen in FIG. 7, and another pair of winches are preferably connected to the sides of each of the load beds 30 adjacent the forward ends thereof, as best seen in FIG. 1, for purposes hereafter described.

OPERATION

When using the semitrailer and tractor combinations 10 and 19 to haul grain or the like, the two vehicles will be loaded with the pay loads at one point and be driven to a destination by a pair of drivers. After unloading the cargo at the destination, the two drivers may then work together to prepare the vehicles for the return trip in accordance with the method of the present invention as follows. First the tarpaulin (not illustrated) and ribs 230 are removed from the side boards 180 and 181 of each truck. Next, the side boards 180 and 181 are pivoted into horizontal positions such that the inner face 198 rests uniformly upon the upper face of the load bed 30. The end gates 200 and 202 are then pivoted into the horizontal position and rest upon the horizontally disposed side boards 180 and 181. The ribs 230 and tarpaulin for each semitrailer may then be placed on the respective load beds 30 between the side boards as illustrated in FIG. 7.

Next, the lift apparatus 110 on the semitrailer 26 is lowered to the position shown in FIG. 4 so as to engage the ground and support the forward end of the semitrailer 26 so that the tractor 20 can then be driven from under the semitrailer. If necessary, the rear bogie wheels of the semitrailer 26 can be locked by air brakes in the conventional manner while the tractor 20 is moved from under the semitrailer. The forward end of the semitrailer 26 can then be lowered by operation of the hand cranks 164 and 166 until the forward end rests on the surface of the ground 150 to form an inclined ramp.

The wheel base of the semitrailer and tractor combination 10 is then reduced in the following manner. First, the rear support or bogie wheels 84 and 86 are locked and the bar 101 is removed from the web of the I-beams 32 and 34 such that the bogey wheel frame 56 is free to slide forwardly along the track means formed by the flanges 50 and 54. The tractor 14 is then backed up until the semitrailer 12 is moved rearwardly over the bogie wheel frame 56 and bogie wheels 84 and 86 and the forward stops 102 engage the forward end of the bogie frame 56. Then the bar 101 is inserted in the apertures 104 to lock the bogie frame 56 in the forward position. As the tractor 14 is backed up and the bogie frame 56 moved forwardly, relative to the load bed 30, along the sloping track means formed by the flanges 50 and 54, the sloping track will raise the rear end of the semitrailer 12 relative to the bogie wheels 84 and 86 and therefore relative to the surface supporting the wheels.

If necessary, the fifth wheel 18 on the tractor 14 is moved from the rear position to the forward position as illustrated in FIG. 1. This can be accomplished merely by releasing whatever stops (not illustrated) secure the fifth wheel frame 234 in the rear position on the track means 232, and backing the tractor 14, with the bogie wheels 84 and 86 still locked, until the fifth wheel is in the forward position. As the fifth wheel 18 is moved forward, the forward end of the load bed 30 will be raised sufficiently that the center portions of the I-beams 32 and 34 will not contact the rear end of the tractor 14 as the vehicle is maneuvered as hereafter described. Even though the forward end of the load bed 30 is raised slightly by the inclined track means 232, due to the relatively great distance to the bogie wheels 84 and 86, the rear end of the load bed 30 will not be appreciably lowered.

After the bogie wheel frame 56 has been moved to the forward position on the inclined track means of the load bed, and the fifth wheel 18 has been moved to the forward position on the inclined track means 232, the overall wheel base of the semitrailer and tractor combination 10 will be appreciably less than the length of the load bed 30 of the semitrailer 26. It will be appreciated that on some vehicles it will be unnecessary to move the fifth wheel 18 forward to reduce the overall wheel base of the vehicle and accordingly, the track means 232 may be eliminated.

Next, the shortened semitrailer and tractor combination 10 is driven forwardly onto the semitrailer 26 such that the tractor 14 will be positioned at the rear end of the semitrailer 26, as illustrated in FIG. 1. The lift apparatus 110 is then actuated by rotation of the hand cranks 164 and 166 to raise the forward end of the semitrailer 26 sufficiently high that the tractor 20 may be backed under the forward end which is then connected to the fifth wheel 24. The raised rear end of the semitrailer 12 will extend over the cab of the tractor 20, substantially as illustrated in FIG. 1, and will permit complete maneuverability of the vehicle. The lift apparatus 110 may then be retracted so that the semitrailer 26 will be roadable. A series of chocks 242 may be placed on each side of the bogie wheels 84 and 86 of the semitrailer 12 and on each side of the wheels of the tractor 14. The cables 244 from the cable winches 240 located on each of the semitrailers are then connected to the other semitrailer and tightened to secure the semitrailer and tractor combination 10 in position. In this respect, it will be noted that the cables 244 from the winches 240 on the rear of the semitrailer 26 are connected to the front of the tractor 14, the cables 244 from the winches 240 at the front of the semitrailer 26 are connected to the bogie wheel frame 56 of the semitrailer 12, the cables 244 from the winches 240 along the sides of the semitrailer 26 extend upwardly and are connected to the semitrailer 12, and the cables 244 from the winches 240 along the sides of the semitrailer 12 extend downwardly and are connected to the semitrailer 26.

With the semitrailer and tractor combination 10 thus secured, the semitrailer and tractor combination 19 may then be driven back to the point of origin of the trip. In this connection, it will be appreciated that the two drivers working together can relatively quickly load one of the semitrailer vehicles on the other. Then the two drivers can start the return trip immediately, taking turns driving the tractor 20 and resting in the sleeper cab 22 which is illustrated.

Another embodiment of the invention is depicted in FIG. 10—13 of the drawings. In these drawings, a portion of a semitrailer, designated generally by reference numeral 300, is illustrated. The semitrailer 300 includes an elongated load bed 310, the rear portion of which is portrayed in FIGS. 10-13. The load bed 310 is fabricated from a pair of longitudinally extending parallel I-beams 312 and 314 which extend the entire length of the load bed, and are interconnected at the ends in the manner previously described herein. Positioned intermediate the I-beams 312 and 314, and extending substantially parallel thereto, is a relatively smaller and shorter central I-beam 316 which is suspended beneath the plates or boards of the load bed deck or floor, and is retained and supported by a means of suitable, transverse cross braces 320 in its position between the main I-beams 312 and 314. Plywood or other wooden decking can be used for securement to the upper sides of the several I-beams, and formation of the load supporting surface of the elongated load bed of the semitrailer in the manner hereinbefore described.

In referring to the I-beams 312 and 314 employed in the embodiment of the invention illustrated in FIGS. 10-14, it will be noted that, as contrasted with the beams 32 and 34 described in referring to an earlier embodiment herein described, the I-beams of the present embodiment have lower flanges 322 and 324 which are straight throughout the length of the I-beams, and extend parallel to the top flange thereof. The lower flanges 322 and 324 of the I-beams 312 and 314 form tracks for a bogie wheel subassembly, designated generally by reference numeral 325. Each of the lower flanges 322 and 324 has a slot (322a and 324a, respectively) formed in the outer side of the flange for a purpose hereinafter described. The bogie wheel subassembly 325 includes a framework formed by a pair of longitudinally extending frame members 326 which are interconnected and joined by a forward, transversely extending frame member 328, a rear, transversely extending frame member 330 and a pair of intermediate or centrally located transversely extending frame members 332 and 334. There are also provided, as a portion of the framework, a pair of diagonal brace members 336 and 338 which extend diagonally across the front portion of the frame as shown in FIG. 11.

The bogie wheel subassembly framework carries, at the forward side thereof, two pairs of transversely spaced, downwardly extending brackets 339. Each bracket pair 339 pivotally engages and supports the forward end of a front leaf spring 340. The front leaf springs 340 are utilized to suspend and support beneath the framework, ground engaging wheels 342. The rear end of each front leaf spring 340 is engaged by a suitable stud or pin 344 which fastens or secures the leaf spring to an anchor plate 346. In referring to FIGS. 10 and 11, it will be noted that a pair of the anchor plates 346 are provided, and are welded to the longitudinally extending frame members 326 and project downwardly from these frame members at opposite sides of the framework. A pair of rear leaf springs 350 are provided for the purpose of supporting the second of the tandem ground engaging wheels 352 of the bogie structure, and each of the rear leaf springs 350 has its forward end secured to one of the anchor plates 346, and its rear end secured between a pair of downwardly projecting support brackets 354. The opposed ground engaging wheels 342 and 352 of the bogie structure are interconnected by suitable spaced axles 358 and 360 in a manner well understood in the art, and as shown in FIGS. 11 and 12.

At the outer side of the framework of the bogie wheel subassembly 325, a pair of ramp plates 362 and 364 are secured to the respective longitudinal frame members 326 so as to extend at an incline with respect to the horizontal as best shown in FIGS. 10 and 13. Each of the ramp members 362 and 364 is supported at its rear, most elevated end by means of a vertically extending post 366 which is secured to the outer side of the respective longitudinally extending frame member 326. Each of the posts 366 carries a retaining plate 367 which extends over the outer side of the lower flange 322 or 324 of the respective I-beam, and tracks along this flange as the load bed 310 is moved relative to the bogie wheel subassembly 325 in a manner hereinafter described. It may here be pointed out that the retaining plates 367 are of lesser width than the slots 322a and 324a hereinbefore described, so that the retaining plates are able to pass through these slots in the lower flanges of the I-beam.

For the purpose of pivotally engaging the bogie wheel subassembly 325 with the I-beams 312 and 314 of the load bed 310, a pair of slide brackets 368 and 370 are pivotally secured by means of hinges 372 and 374, respectively, to the forward side of the forward, transversely extending frame member 328. The purpose of this pivotal connection will be hereinafter explianed. Each of the slide brackets 368 and 370 is of generally C-shaped configuration as shown in FIG. 12, and thus is provided with a pair of opposed upper flanges which engage and ride upon the upper sides of the lower flanges 322 and 324 of the I-beams 312 and 314, respectively. The slide brackets 368 and 370 are thus free to slide along the I-beams 312 and 314 in a fore and aft direction as the entire bogie wheel subassembly 325 is moved in relation to the elongated load bed 310 in a manner, and for a purpose, hereinafter explained. At the central portion of the forward, transversely extending frame member 28, a central slide bracket 376 is secured to the upper side of a pillow block 377 which is pivotally secured to the transversely extending frame member 328 by means of a hinge connection 378. The hinge connection 378 facilitates pivotation of the pillow block 377 and the central slide bracket 376 about a horizontal axis. The central slide bracket 376 is constructed similarly to the slide brackets 368 and 370 so that upper flanges thereof engage the upper side of the lower flange of the central I-beam 316.

Mounted on the pillow block 377 on opposite sides of the central slide bracket 376 are a pair of hydraulic piston and cylinder subassemblies 380 and 382. The hydraulic piston and cylinder subassemblies 380 and 382 include extensible piston rods 384 and 386, respectively, which can, upon actuation of the subassemblies, be extended through holes formed through the adjacent sides of the central slide bracket 376. These holes and the direction of extension of piston rods 384 and 386 are such that when the piston rods are extended, they will engage and interlock with notches or reliefs 387 found in the opposite side edges of the lower flange of the central I-beam 316. This engagement, when effected, locks the bogie wheel subassembly 325 in a fixed position in relation to the elongated load bed 310.

For the purpose of enabling the bogie wheel subassembly 325 to be moved in a longitudinal direction relative to the elongated load bed 310, a plurality of rollers 388, 390, 392 and 394 are rotatably mounted in the longitudinally extending frame members 326 and project above the upper surface thereof for rolling contact with the lower side of the lower flanges 322 and 324 of the longitudinally extending I-beams 312 and 314.

Secured to the web portion of each of the longitudinally extending parallel I-beams 312, 314 and projecting outwardly therefrom on opposite sides of the elongated load bed 310, are a pair of rollers 396 and 398. The rollers 396 and 398 are positioned relatively low on the web portions of the respective longitudinally extending parallel I-beams, and are aligned with the inclined ramp plates 362 and 364 carried on the bogie subassembly 325 for a purpose hereinafter described.

At the rear end of the elongated load bed 310, a retractable bumper assembly is provided, and is designated generally by reference numeral 400. The retractable bumper assembly 400 includes a pair of substantially parallel, downwardly extending supporting plates 402 and 404 which are connected at the lower ends thereof to an elongated, substantially horizontally extending channel shaped bumper 406. The upper end portions of the downwardly extending supporting plates 402 and 404 extend through cutaway portions on the inner side of the lower flanges 322 and 324 of the respective longitudinally extending I-beams 312 and 314. The end portions of the supporting plates pass adjacent L-shaped retainer plates 410 and 412 mounted on the inner sides of the I-beams 312 and 314 by securement of the lower edges of the retainer plates to the inner edges of the I-beam lower flanges 322 and 324 in the manner best illustrated in FIGS. 11 and 13.

The upper portions of the downwardly extending supporting plates 402 and 404 are pivotally connected between the web portions of the elongated, longitudinally extending I-beams 312 and 314 and the L-shaped retainer plates 410 and 412 by means of pivot pins 416 and 418, which pivot pins are projected through aligned holes in the I-beams and retainer plates. Spaced from the pivot pins 416 and 418 are a pair of locking bolts 420 and 422, which locking bolts are extended through aligned holes in the upper ends of the I-beams 312 and 314 and in the retainer plates 410 and 412. Both the pivot pins 416 and 418 and the locking bolts 420 and 422 are employed when the bumper is in its extended, operative position as shown in FIG. 13, and in FIG. 10 (in full lines).

At a time when it is desired to store the bumper assembly and move it upwardly into alignment with the I-beams 312 and 314 to thereby eliminate the downwardly extending obstruction constituted by the bumper in its operative position, the pivot pins 416 and 418 and also the locking bolts 420 and 422 are removed, and the bumper is lifted upwardly and pushed forward into a stored position in which it extends in a horizontal direction between the retainer plates 410 and 412, and the webs of the I-beams 312 and 314, as shown in dashed lines in FIG. 10. When the bumper assembly 400 is moved to this stored status, the locking bolts 420 and 422 can be used to secure the bumper assembly in this position by extending the bolts through holes formed through the webs of the respective I-beam 312 or 314, and the holes formed in the upper end portions of the downwardly extending supporting plates 402 and 404 (used in the operative, downwardly extending position of the bumper, for then accommodating the locking bolts 420 and 422). The purpose of this retractable, stored status arrangement of the bumper will be hereinafter explained in greater detail.

OPERATION OF THE EMBODIMENT OF THE INVENTION DEPICTED IN FIGS. 10–14

The embodiment of the invention illustrated in FIGS. 10–14 provides yet another structure which may be employed for the purpose of elevating the rear end portion of the semitrailer 300 of a tractor-semitrailer arrangement for the purpose of piggyback transport in the manner hereinbefore described. Stated differently, by the use of the structure depicted in FIGS. 10–14, the rear end portion of the elongated load bed 310 of the semitrailer 300 can be elevated above its normal, over-the-road position so that the elevated rear end of the load bed can pass over and clear the cab of a towing tractor in the same manner as that embodiment of the invention illustrated in FIG. 1.

In describing the operation of this embodiment of the invention, it may be initially pointed out that basically, the end portion of the elongated load bed 310 is elevated by moving the bogie wheel subassembly 325 between two operative positions. These are the two positions illustrated by the two full line positions of the bogie wheel subassembly 325 shown in FIGS. 10 and 14. Referring first to FIG. 10, this position is the over-the-road position in which the elongated load bed 310 is substantially level, and extends substantially horizontally, and in which the semitrailer 300 is used for carrying a load in regular transport service. In this position, the bogie wheel subassembly 325 is located relatively far to the rear on the elongated load bed 310, and at this time it will be noted that the ramp plates 362 and 364 are relatively far displaced rearwardly from the ramp engaging rollers 396 and 398 carried on the web portions of the I-beam 312 and 314. It will further be noted that the rollers 388–394 mounted in the longitudinally extending frame members 326 are in rolling contact with the lower side of the lower flanges 322 and 324 of the I-beams 312 and 314. Finally, it will be noted that the hydraulic piston and cylinder subassemblies 380 and 382, and also the central slide bracket 376, are relatively far displaced toward the rear of the I-beam 316. In this arrangement, the full weight of the load, as supported on the elongated load bed 310, is transmitted to the tandem wheels 342 and 352 of the bogie wheel subassembly 325. The bogie wheel subassembly 325 is retained in the described position by the engagement of the piston rods 384 and 386 of the subassemblies 380 and 382 with the reliefs 387 formed in the opposite edges of the lower flange of the central I-beam 316.

It is frequently desirable with various types of cargoes placed in locations resulting in different weight distribution patterns on the elongated load bed 10 to change the position of the tandem wheels 342 and 352 in relation to the total length of the load bed. The capability of changing the position of the ground engaging wheels relative to the total length of the load bed will afford better distribution of the total weight as between the tandem wheels forming a portion of the bogie subassembly 325, and the wheels located at the forward end of the semitrailer 300. Further, the extent to which the semitrailer and its load will bounce or ride roughly over uneven terrain or rough roads can also be ameliorated by adjustment of the position of the bogie wheel subassembly 325 in the manner described.

For the purpose of making this type of adjustment in the position of the bogie wheel subassembly 325 in relation to the elongated load bed 310, the ground engaging wheels 342 and 352 may be chocked so as to prevent their movement, and the tractor connected to the semitrailer 300 then used to back or advance the semitrailer 300 and its load bed 310 in relation to the fixed or blocked ground engaging wheels 342 and 352. During this relative movement accomplished by the tractor, the hydraulic piston and cylinder subassemblies 382 and 380 are actuated to retract the piston rods 384 and 386 and disengage them from the reliefs 387 formed in the lower flange of the central I-beam 316, and the central slide bracket 376 is free to slide along the lower flange of the central I-beam. The slide brackets 368 and 370 carried at opposite sides of the framework of the bogie wheel subassembly can also slide freely on the respective lower flanges 322 and 324 of the elongated, longitudinally extending I-beams 312 and 314. After the elongated load bed 310 has been shifted relative to the bogie wheel subassembly 325 in the manner described, the subassembly is locked in the position to which it is adjusted on the load bed by again causing the extension of the piston rods 384 and 386 into locking engagement with the reliefs 387 formed in the lower flange of the central I-beam 316.

When it is desired to mount the semitrailer 300 on the load bed of another semitrailer for piggyback transport in the manner hereinbefore described, the ground engaging wheels 342 and 352 are again chocked to prevent movement relative to the ground, and the piston rods 384 and 386 of the piston and cylinder subassemblies 380 and 382 are retracted to disengage the bogie wheel subassembly 325 from the load bed 310. The tractor connected to the forward end of the load bed 310 is then backed to cause movement of the semitrailer 300 relative to the bogie wheel subassembly 325. In effect, the bogie wheels are caused to move forward, in a relative sense, on the load bed 310. Such forward relative movement of the bogie wheel subassembly 325 is continued until the central slide bracket 376 has approached the forward end of the lower flange of the central I-beam 316, and the piston rods 384 and 386 are substantially opposite the forwardmost reliefs 387 formed at this point (the forward end of the lower flange of the central I-beam 316).

As the bogie wheel subassembly 325 approaches this position, the ramp plates 362 and 364 approach and make contact with the rollers 396 and 398 carried on, and projecting outwardly from, the web portions of the elongated, longitudinally extending I-beams 312 and 314. Continued backing of the elongated load bed 310 results in the rear portion of the bogie wheel subassembly 325 being moved downwardly relative to the I-beams 312 and 314 of the elongated load bed 310. In actuality, the rear portion of the elongated load bed 310 is elevated from its horizontally extending or level position in the manner shown in FIG. 14 where the over-the-road transport position of the load bed is depicted in dashed lines, and its elevated, piggyback transport position is illustrated in full lines. The downward movement of the rear portion of the bogie wheel subassembly 325 relative to the load bed 310 can occur because the retaining plates 367 projecting from the posts 366 can pass through the slots 322a and 324a, and because the slide brackets 368, 370 and 376 are all pivotally connected to the framework at the bogie wheel subassembly. When the described elevated status of the load bed has been achieved, the piston rods 384 and 386 of the piston and cylinder subassemblies 380 and 382 are again extended so as to engage the slots or openings formed in the lower flange of the central I-beam 316, thus locking the bogie wheel subassembly 325 in the piggyback transport position.

In order to prevent the retractable bumper assembly 400 from interfering with the extension of the raised rear portion of the load bed 310 of the semitrailer 300 over the cab of the tractor-semitrailer combination upon which the semitrailer 300 is to be mounted for piggyback transport, the pivot pins 416 and 418 and the locking bolts 420 and 422 are removed from their positions of engagement with the upper end portions of the downwardly extending supporting plates 402 and 404, and the bumper 408 is then lifted upwardly and is pivoted so that the plates 402 and 404 can be pushed forward into their stored positions in which they lie between the retaining plates 410 and 412 and the webs of the I-beams 412 and 414. The stored status of the retractable bumper assembly 400, preparatory to loading the semitrailer 300 on the bed of the second semitrailer for over-the-road transport is illustrated in dashed lines in FIG. 10.

After the bogie wheel subassembly 325 and the retractable bumper assembly 400 have been placed in the piggyback transport status in the manner described, the semitrailer 300 can be loaded upon the load bed of a second semitrailer for piggyback transport in the manner hereinbefore described.

Having thus described several preferred embodiments and subcombinations of the present invention, it is to be understood that various changes, substitutions and alterations can be made therein without departing from the spirit and scope of the present invention as defined by the appended claims.

What is claimed is:

1. A method for transporting one vehicle having an operator's cab and a load bed on another similar vehicle having an operator's cab and a load bed comprising the steps of:
   shortening the wheel base of said one vehicle and simultaneously
   raising the rear end of the load bed of said one vehicle; and
   loading said one vehicle onto the load bed of the other vehicle with said one vehicle in a shortened wheel base status in which the wheels of said one vehicle rest upon the load bed of said other vehicle and the rear end of the load bed of said one vehicle extends over the operator's cab of said other vehicle.

2. A method for transporting one vehicle having an operator's cab and a load bed on another similar vehicle having an operator's cab and a load bed comprising the steps of:
   placing the front end of the load bed of said other vehicle on the ground to form an inclined ramp;
   raising the rear end of the load bed of said one vehicle; and
   driving said one vehicle onto the load bed of said other vehicle to a position such that the raised rear end of the load bed of said one vehicle extends over the operator's cab of said other vehicle.

* * * * *